Feb. 4, 1969  D. A. MILLER ET AL  3,426,227

MOTOR FIELD MOUNTING

Filed Oct. 4, 1967

INVENTORS
DANIEL A. MILLER
WILLIAM F. SAFFELL
BY
ATTORNEY

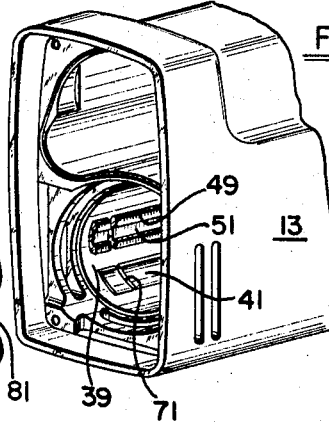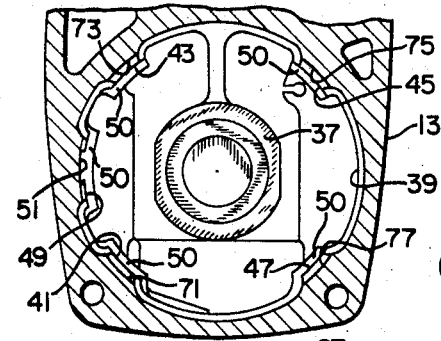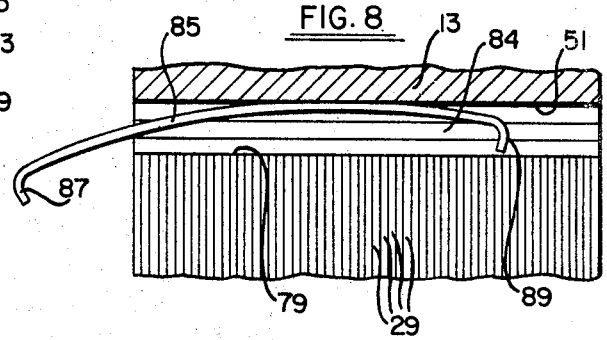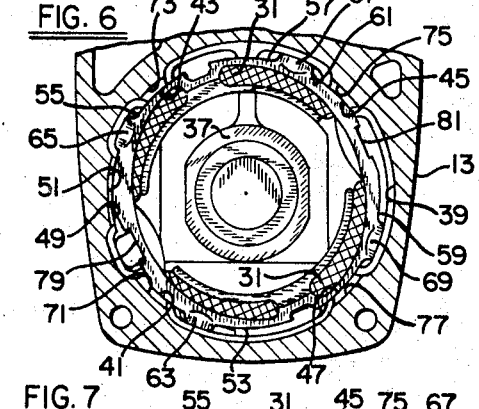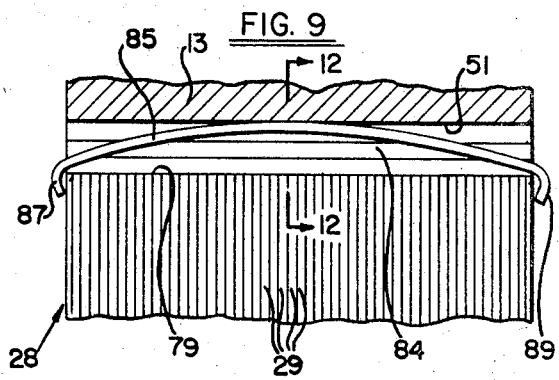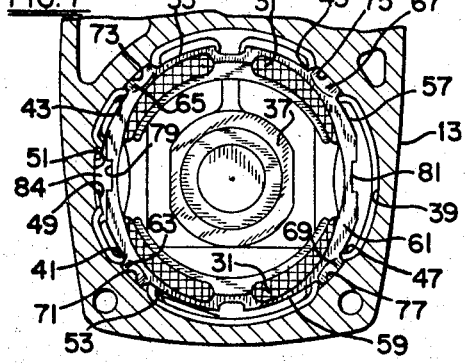
INVENTORS
DANIEL A. MILLER
WILLIAM F. SAFFELL
ATTORNEY United States Patent Office 3,426,227
Patented Feb. 4, 1969

3,426,227
MOTOR FIELD MOUNTING
Daniel A. Miller, Glen Arm, and William F. Saffell, Rocks, Md., assignors to The Black and Decker Manufacturing Company, Towson, Md., a corporation of Maryland
Filed Oct. 4, 1967, Ser. No. 672,830
U.S. Cl. 310—180        10 Claims
Int. Cl. H02k 5/04

ABSTRACT OF THE DISCLOSURE

A portable electric tool which includes a housing having an electric motor supported therein. The motor is of the universal type having a stationary field core and a rotatable armature and which, when energized, is adapted to power the tool. The field core includes laminations or stackings, and field windings and is removably secured within the housing.

Summary of the invention

The present invention includes an improved and simplified motor field core mounting wherein the field core is securely held in place but is easily removable, which permits the use of a smaller diameter field core and obviates the need for bulky and complex separate fasteners and therefore reduces the overall weight and cost of the motor, which compensates for small manufacturing tolerances in both the housing and field core and which is vibration and generally stress proof. This is achieved by providing outwardly projecting tabs on at least one of the field core laminations, and at least an equal number of lands within the housing. The lands are each provided with a slot adapted to receive a respective tab when the field core is in place within the housing. The field core laminations and the housing also have longitudinally running slots adapted to align when the field core is in place and into which a spring key is inserted. The key securely locks in place, prevents the field core from rotating and keeps the tabs from coming out of their slots and, in addition, presses the field core laminations snugly against the lands. Furthermore, the tabs preferably are initially deformed. e.g., bulged, so that they distort when moved into place in the land slots thereby serving to take up manufacturing tolerances in the tabs and land slots.

Main objects of the present invention, therefore, are to provide an improved motor field core mounting for a universal electric motor with which the field core is positively and securely held in place in a housing but is readily assembled and removable, which eliminates bulky or complex separate fasteners and thereby makes possible the use of a smaller field core and a lighter weight and lower cost overall assembly, which compensates for small manufacturing tolerances in the field core and the housing, and which is relatively unaffected by vibrations and/or other external stresses imposed on the motor or its parts.

Further objects of the present invention are to provide an improved field core mounting of the above character which is adapted for use in a wide variety of installations and which is relatively inexpensive to manufacture, rugged in construction and reliable in use.

Other objects and advantages of the present invention will become more apparent from a consideration of the detailed description to follow taken together with the drawings annexed hereto.

Brief description of the drawings

FIG. 4 is a perspective view of the structure of FIG. 3 and with the motor armature removed for clarity;
FIGS. 5, 6 and 7 are sectional views, illustrating sequentially the housing with the field core removed, the housing with the field core initially inserted, and the housing with the field core locked in place, respectively;
FIGS. 8 and 9 are enlarged sectional views illustrating the manner of inserting the spring key and shows this key in the locking position, respectively;
FIG. 12 is a sectional view of FIG. 9 taken along the line 12—12 thereof.

Broad statement of the invention

Broadly described, the present invention includes a housing having a generally cylindrical cavity therein, a plurality of arcuately spaced lands extending longitudinally of said cavity, at least some of said lands each having at least one arcuately extending slot formed therein, a motor field core adapted to be received in said cavity, said field core including laminations adapted to be slidably received by said lands, at least one of said laminations having a plurality of outwardly projecting tabs adapted to be received in respective ones of said land slots when said field core is in place within said cavity, said housing and said field core having longitudinally extending slots adapted to align and form a keyway when said field core is in place with said cavity and said tabs received in said land slots, and a key adapted to be received in said aligned, longitudinal slots.

Detail Description

Figure 1:
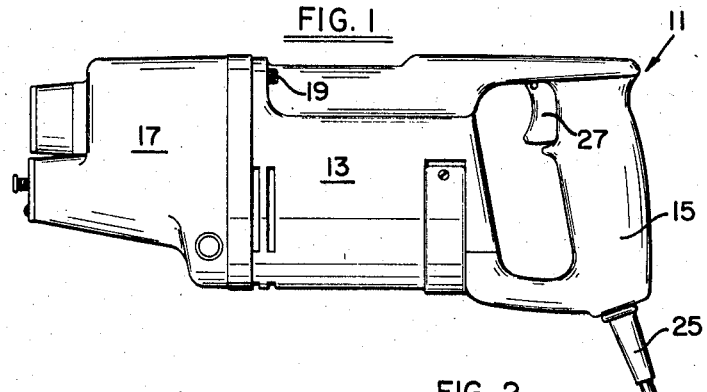
FIG. 1 is a side elevational view illustrating a portable electric tool embodying the present invention.

Referring now more specifically to the drawings, a portable, electric, rotary hammer, embodying the present invention, is illustrated generally at 11 in FIG. 1. It is to be understood, however, that this tool is given by way of example only and that the present invention, while particularly adapted for use in this hammer 11, also finds use in the general class of electric motors and electric motor operated devices and tools, both of the portable and stationary variety.

With this in mind, the hammer 11 is seen to include a motor housing 13 having a rear handle 15, and with a gear case 17 secured thereto by screws 19. An electric motor 21, having a motor shaft 23, is disposed within the motor housing 13 and is adapted to be energized from a suitable power source connected thereto by a line cord 25 and is controlled by a handle mounted switch 27. The motor 21 is adapted to rotate and impart a hammer blow to a tool bit (not shown) through a gear transmission (not shown) and a motion transmission and impact mechanism (not shown) which may be positioned in the gear case 17 and motor housing 13. Since these mechanisms form no part of the present invention they are not illustrated nor described further here.

The motor 21 is seen to be of the universal type having a stationary field core 28 made up of laminations 29 and field windings 31. An armature, including armature windings 33, a commutator 35 and the shaft 23, is rotatable within the field core as is customary. Bearings, one of which is shown at 36, support the shaft 23 fore and aft and are carried by a removable motor housing cover (not shown) and a recessed boss 37 at the rear end of the motor housing 13. For a detailed illustration of this bearing construction, reference again may be made to the above referred to copending applications.

According to the present invention, the field core is secured in place within the motor housing 13 by means calculated to achieve the inventive object set out above. Thus, as shown in FIGS. 2–7, the motor housing 13 has a generally cylindrical cavity 39 formed therein adapted to receive the motor 19. A plurality of, and preferably four, arcuately spaced lands 41, 43, 45, 47 are formed integrally with the motor housing 13 within the cavity 39 and extend longitudinally thereof. Another land 49 is formed substantially intermediate the lands 41, 43 and also extends longitudinally of the cavity 39. The lands 41, 43, 45, 47 are preferably, but not necessarily, equi-angularly spaced and each of the lands 41, 43, 45, 47, 49 has a generally radially extending abutment shoulder 50 adjacent its inner end for a purpose to be described. In addition, the land 49 has a generally rectangular slot 51 intermediate its width and extending generally its entire length.

The field core laminations 29 similarly are formed with four arcuately shaped peripheral surface portions 53, 55, 57, 59 which when the field core is inserted into the cavity 39, slidably engage the lands 41, 43, 45, 47, respectively. In addition, one of the laminations, preferably the outermost one and shown at 61, has preferably four outwardly projecting tabs 63, 65, 67, 69 adapted to be received in arcuate slots 71, 73, 75, 77 formed in the lands 41, 43, 45, 47, respectively. Also, all of the laminations 29 are slotted at least along one side to define a longitudinally extending slot 79 between the surface portions 53, 55 which slot 79 is adapted to align with the slot 51 in the land 49 when the field core is finally positioned in the cavity 39, for a purpose to be described. Preferably, however, the laminations 29 are slotted along their other side to define another longitudinal slot 81 diametrically opposite the slot 79 and between the surface portions 57, 59.

To assemble the field core in place within the cavity 39, the laminations 29 are oriented so as to position the tabs 63, 65, 67, 69 slightly counterclockwise of the lands 41, 43, 45, 47, respectively, substantially as shown in FIG. 6. The field core can then be freely inserted axially into the cavity 39 until the innermost laminations 29 seats against the shoulder surfaces 50 formed on the lands 41, 43, 45, 47, 49. These shoulder surfaces 50 are so positioned axially in the cavity 39 that when the field core bottoms against them, the tabs 63, 65, 67, 69 are aligned with the slots 71, 73, 75, 77. The field laminations 29 are then turned in a lockwise direction causing the tabs 63, 65, 67, 69 to move into the slots 71, 73, 75, 77, substantially as shown in FIG. 7. In this position of the parts, the interengaged tabs 63, 65, 67, 69 and slots 71, 73, 75, 77 prevent the field core from coming out of the cavity 39.

In addition, the slots 51, 79 are aligned and together form a keyway 84, adapted to receive a bowed spring key 85 which holds the field core against turning within the cavity 39 and therefore the tabs 63, 65, 67, 69 from coming out of the slots 71, 73, 75, 77. As shown in FIG. 9, the spring key 85 is bent over at its opposite ends 87, 89, so that when in position, these bent over ends 87, 89 engage opposite ends of the field core and hold the spring key 85 in place therein.

Figure 10:
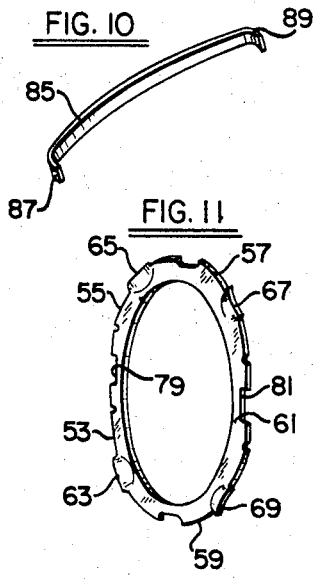
FIG. 10 is a perspective view illustrating the spring key of the present invention.

The bowed configuration and spring nature of the key 85, as seen perhaps best in FIGS. 8–10, causes an intermediate portion of the spring key 85 to bear snugly against the wall of the slot 51, as shown in FIGS. 9 and 12, when in position within the keyway 84. This forces the outer ends of the spring key 85 against the field core 28, as shown in FIG. 9, holding the bent over ends 87, 89 in such a position as to prevent inadvertent or accidental withdrawal of the key 85 from the keyway 84.

Figure 11:
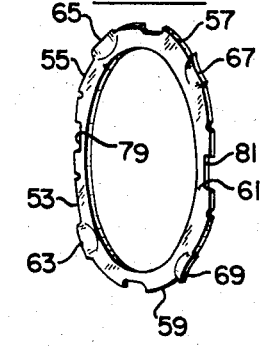
FIG. 11 is a perspective view illustrating the tabbed field core lamination of the present invention.
Figure 2:
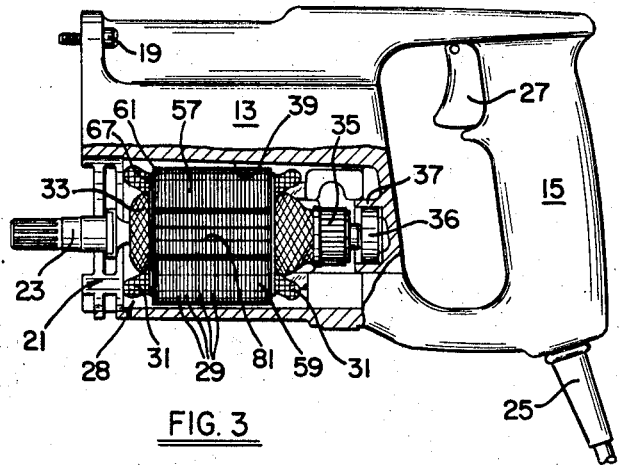
FIG. 2 is a view, similar to FIG. 1, but with parts removed and partly in section to illustrate a motor in place and embodying the present invention.
Figure 3:
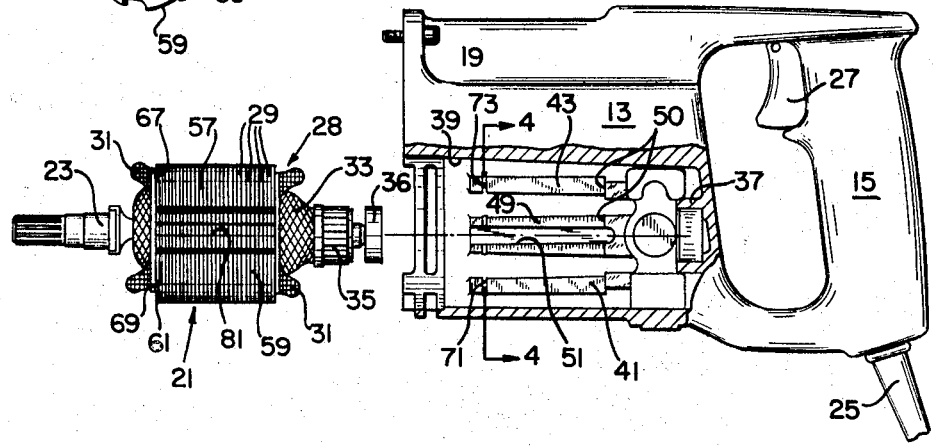
FIG. 3 is an exploded view of the structure of FIG. 2.

In addition, the bowed configuration of the key 85, and its spring nature, causes the center of the spring key 85 to seat against the slot 51 and biases the field core 28 in a radial direction to snugly seat the core surface portions 57, 59 against the lands 45, 47, respectively. Also, the tabs 63, 65, 67, 69 on the field lamination 61 are bulged, as shown perhaps best in FIG. 11, so that they distort upon moving into the slots 71, 73, 75, 77, respectively. Thus, the bowed spring key 85 biases the field core radially and takes up radial manufacturing tolerances between the field core and the cavity 39, and specifically between the core surfaces 53, 55, 57, 59, and the lands 41, 43, 45, 47, respectively. The bulged tabs 63, 65, 67, 69, on the other hand, prevent axial movement of the core and take up axial manufacturing tolerances between these tabs and the slots 71, 73, 75, 77.

In addition, this construction provides a resilient and a vibration absorbing field core mounting which is highly advantageous in high stress installations such as, for example, the rotary hammer illustrated in the drawings, in all installations, the field core mounting of this invention is highly advantageous in that it eliminates the need for separate, bulky and complex fasteners and yet provides a positive and strong, field core mounting as well as one which facilitates easy assembly and disassembly.

By the foregoing, there has been disclosed an improved electric motor field mounting calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In combination, a housing having a generally cylindrical cavity therein, a plurality of arcuately spaced lands extending longitudinally of said cavity, at least some of said lands each having at least one arcuately extending slot formed therein, a motor field core adapted to be received in said cavity, said field core including laminations adapted to be slidably received by said lands, at least one of said laminations having a plurality of outwardly projecting tabs adapted to be received in respective ones of said land slots when said field core is in place within said cavity, said housing and said field core having longitudinally extending slots adapted to align and form a keyway when said field core is in place within said cavity and said tabs received in said land slots, and a key adapted to be received in said aligned, longitudinal slots.

2. The combination as defined in claim 1 wherein said key comprises a generally elongated, spring like member adapted, when in said keyway to bear laterally against said housing and prevent inadvertent withdrawal of said key from said keyway.

3. The combination as defined in claim 1 wherein each of said tabs is deformed in a direction axially of said cavity and is adapted, when positioned in respective ones of said land slots, to be distorted and take up axial clearance therebetween.

4. The combination as defined in claim 2 wherein said elongated member has its ends bent over and adapted, when in said keyway, to overlay opposite ends of said field core.

5. The combination as defined in claim 3 wherein each of said tabs is bulged in a direction axially of said cavity.

6. The combination as defined in claim 1 wherein said core is adapted to be inserted in and removed from said cavity by orienting said core so that said tabs are disposed intermediate said lands, said tabs being adapted to be positioned in said land slots by turning said field core relative to said housing when said tabs and land slots are arcuately aligned.

7. The combination as defined in claim 6 wherein said housing is provided with abutment shoulder means therewithin adapted to engage said field core and position said tabs and land slots in arcuate alignment.

8. The combination as defined in claim 1 which includes four generally equi-angularly spaced lands each of which has an arcuate slot therein, said slots being arcuately aligned, said at least one lamination having four generally equi-angularly spaced tabs adapted to be received in respective ones of said land slots, said tabs being adapted to be moved into and out of said land slots by turning said field core relative to said housing when said tabs are arcuately aligned with said land slots.

9. The combination as defined in claim 8 wherein said housing has a key land disposed intermediate two of said first mentioned land, said key land having at least one longitudinally extending slot therein adapted to align with said longitudinally extending slot in said field core when said tabs are positioned in said land slots, said key comprising a spring like member adapted to bias said field core against at least two of said lands to take up radial clearance between said field core and said housing.

10. The combination as defined in claim 1 wherein said land slots are arcuately aligned, said tabs being adapted to be moved into and out of respective ones of said land slots by turning said field core relative to said housing when said tabs are arcuately aligned with said respective ones of said land slots.

References Cited
UNITED STATES PATENTS

| | | | |
|---|---|---|---|
| 2,411,684 | 11/1946 | Hamilton | 310—217 |
| 3,135,887 | 6/1964 | Schaffan | 310—42 |
| 3,274,411 | 9/1966 | Kavanaugh | 310—259 |

WARREN E. RAY, *Primary Examiner.*

R. SKUDY, *Assistant Examiner.*

U.S. Cl. X.R.

310—50, 158, 217, 259